Figure 1:
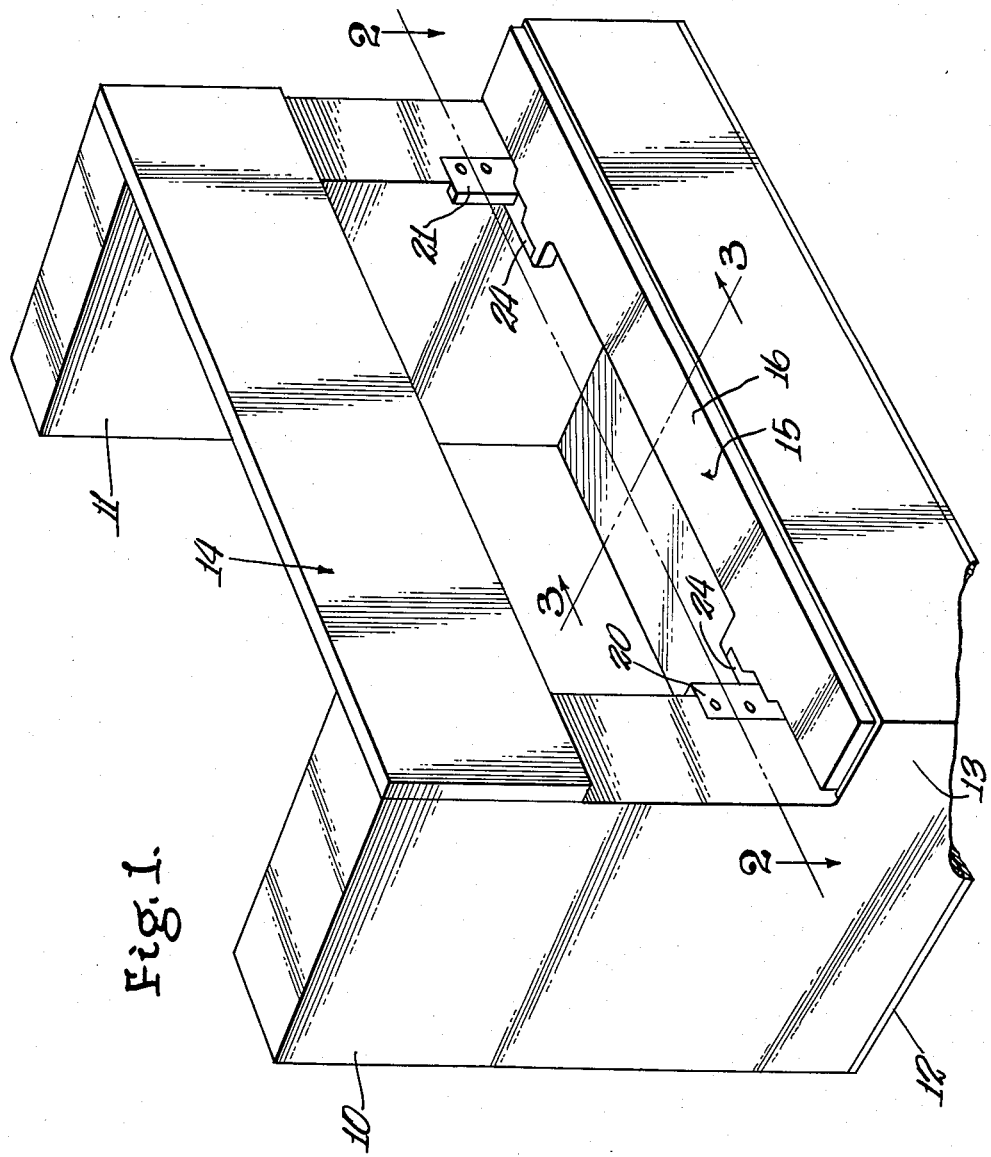

Dec. 31, 1963    W. F. LONGFIELD    3,115,824
PRESS CONSTRUCTION
Filed Sept. 21, 1961    3 Sheets-Sheet 1

INVENTOR.
WILLIAM F. LONGFIELD
BY
ATTORNEY

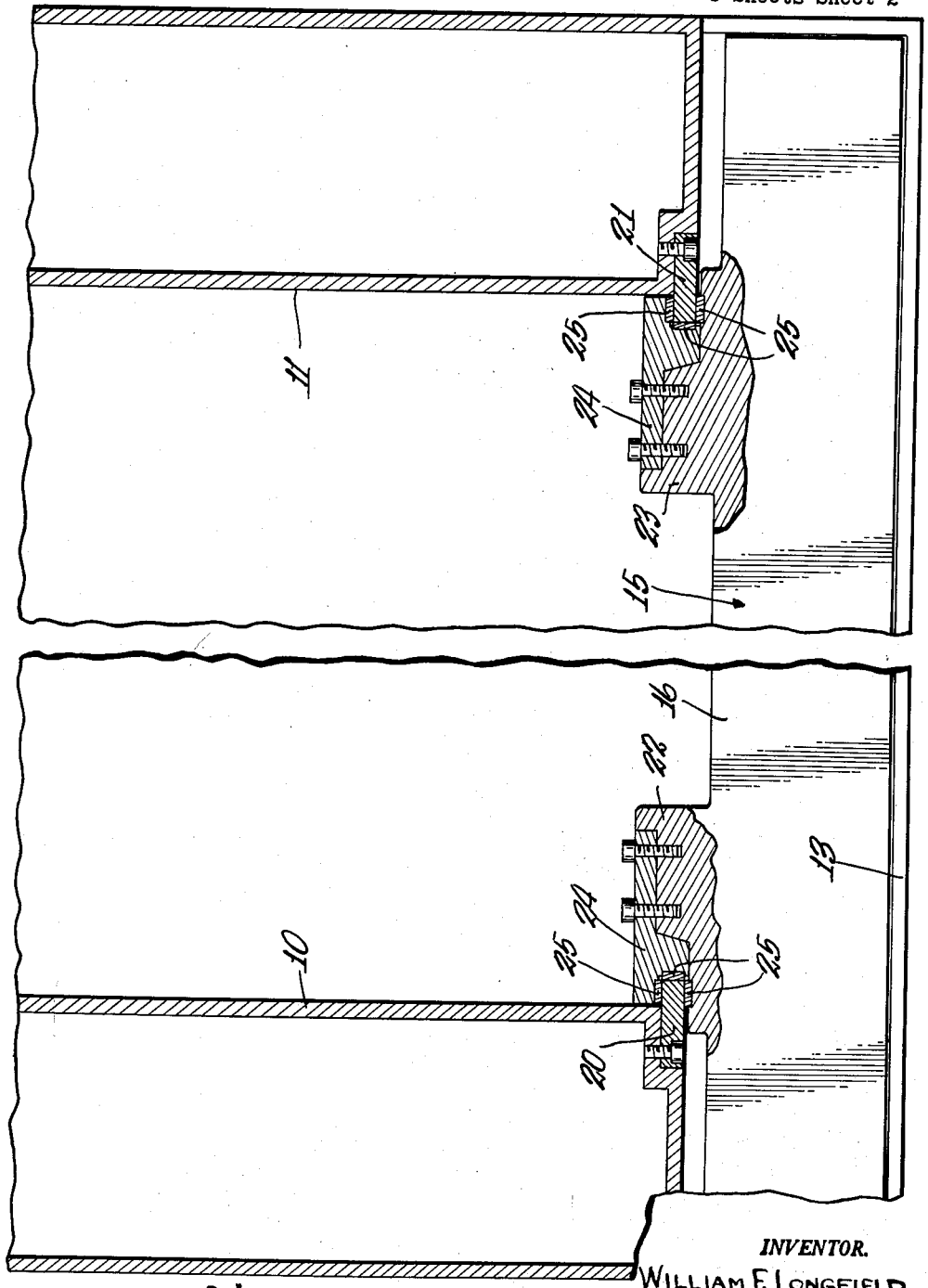

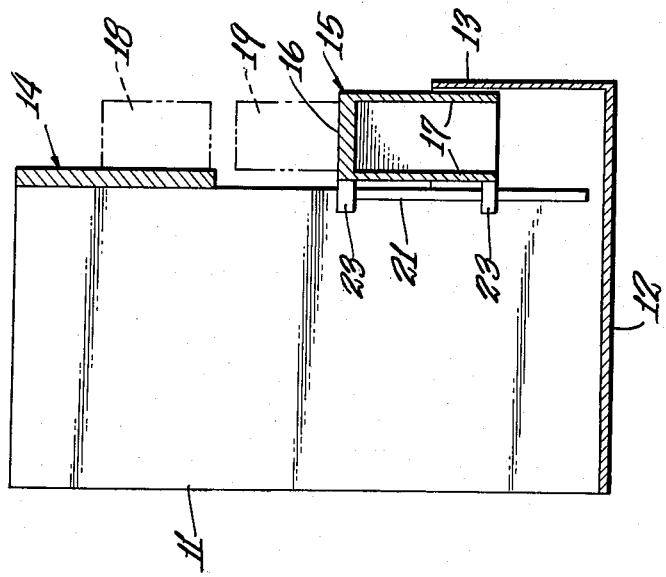
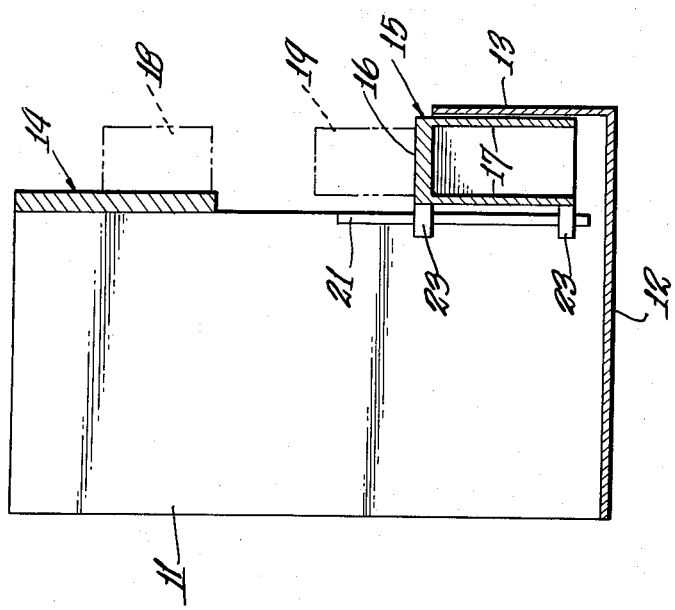

United States Patent Office 3,115,824
Patented Dec. 31, 1963

3,115,824
PRESS CONSTRUCTION
William F. Longfield, Warren, Ohio, assignor to Federal-Warco Division, The McKay Machine Company, Warren, Ohio
Filed Sept. 21, 1961, Ser. No. 139,726
1 Claim. (Cl. 100—214)

The present invention relates to a press construction, more particularly to a welding press construction, and the principal object of the invention is to provide new and improved constructions of the character described.

In a conventional press, an upper platen (or support) is movable generally vertically toward and away from a fixed lower platen (or bolster). However, this arrangement is sometimes reversed; i.e., the lower platen is movable vertically toward and away from a fixed upper platen in certain types of presses, notably welding presses.

In certain types of presses, especially welding presses, it is very desirable that the dies or other cooperating structures carried by respective platens be accessible from at least three sides. When the press is of the conventional type; that is, when the upper platen is movable, the problem of providing a rigid, movable platen is relatively simple since there is usually sufficient overhead space to employ elongated slides which will provide the necessary rigidity. When, however, the lower platen is movable, the problem becomes acute unless the operating range of the lower platen is raised considerably above a normal working height or unless a portion of the press structure is extended below floor level to obtain the necessary elongation of the slides along which the lower platen moves.

In most cases, the lower platen must have an operating range at a convenient working height from the supporting floor. Additionally, in most cases it is required that the welding press be relatively easily shiftable from one location to another; accordingly, this rules out the use of a floor pit into which a portion of the press may depend. As a consequence, prior art press designs not requiring a floor pit and having a vertically movable lower platen at a convenient working height accessible from three sides, have lacked rigidity of the lower platen.

While this lack of rigidity has been tolerated in many applications, recent requirements for greater precision has resulted in the development of the present press structure which does not require a pit but which, nevertheless, provides an extremely rigid, vertically movable lower platen at a convenient working height having complete accessibility from three sides. Other advantages will become apparent from a study of the following description and from the drawings appended hereto.

In the drawings accompanying this specification and forming a part of this application there is shown, for purpose of illustration, an embodiment which the invention may assume, and in these drawings:

FIGURE 1 is a perspective view of a press strucutre embodying the present invention, the conventional operating mechanisms being omitted in the interest of brevity, FIGURE 2 is an enlarged, broken sectional view generally corresponding to the line 2—2 of FIGURE 1, FIGURE 3 is a reduced size sectional view generally corresponding to the line 3—3 of FIGURE 1, and FIGURE 4 is a view smilar to FIGURE 3 but with certain operating parts in another position.

As best seen in FIGURE 1, the press construction chosen to illustrate the present invention comprises a pair of spaced-apart, upright frame members 10 and 11 secured to a connecting base member 12. Such frame members have a forwardly projecting, lower foot portion 13 connected to each other. Extending across the front of the frame members 10 and 11 and interconnecting the upper portions thereof is an elongated member 14 which will hereinafter be referred to as the upper platen. Disposed beneath the upper platen 14 for vertical sliding movement toward and away therefrom is an elongated, lower platen 15 positioned in front of the frame members 10, 11 at the top of the frame foot portions 13.

Lower platen 15 presently comprises a generally rectangular plate 16 having a depending peripheral skirt portion 17 providing an inverted box-like structure (see FIGURE 3) which is vertically slidable within the frame foot portion 13 in a manner to appear. Still referring to FIGURE 3, suitable die parts, welding fixtures, or the like 18, 19 will be secured to respective platens 14, 15 depending upon the type of work the press is to perform. In a well-known manner, such parts 18, 19 will be moved to cooperative relation to perform a function on a workpiece disposed therebetween when lower platen 15 is moved from its lowermost position seen in FIGURE 3 to its uppermost position seen in FIGURE 4.

Since the present invention is not concerned with the manner in which lower platen 15 is moved and since any suitable mechanism well-known to those skilled in the art may be employed for this purpose, such mechanism has been omitted in the interest of brevity as previously mentioned. The present invention is concerned solely with the manner in which the lower platen 15 is supported and guided for movement toward and away from the upper platen 14 and to this end, the following construction is presently employed.

Secured to the forward portion of respective frame members 10, 11 are vertically extending, elongated gibs 20, 21 along which the lower platen is slidable in a manner to be disclosed. These gibs project toward each other from the facing surfaces of respective frame members and extend upwardly of the lower platen when the latter is in its lowermost position seen in FIGURES 1 and 3. In the present embodiment and as best seen in FIGURES 2 and 3, the lower platen is slidably secured to respective gibs 20, 21 at vertically spaced places for maximum rigidity by means of the following construction.

Carried by the rear side of lower platen 15 (that side adjacent the gibs) are vertically spaced bosses 22, 23 adjacent respective gibs. Removably secured to each boss (FIGURE 2) is a clamp bar 24 which partially embraces respective gibs to clamp the platen thereto. Suitable wear plates 25, of a bearing material or the like, may be interposed between the platen and the gibs and between the latter and respective clamp bars to reduce friction therebetween.

It is an important feature of the present invention that each gib 20, 21 projects some distance above the lower platen when it is in its lowermost position. In the present embodiment, the amount of projection is substantially equal to the vertical movement of the platen. This provides for maximum vertical spacing between the platen portions engaged with the gibs to thus rigidly support the platen.

In operation and with the parts positioned as seen in FIGURE 3, a workpiece will be positioned between the fixtures 18, 19 and the lower platen then elevated to the position seen in FIGURE 4 wherein the fixtures are positioned to cooperate with each other to perform a function upon the workpiece disposed therebetween. Following completion of the function upon the workpiece, the lower platen will be lowered to the position seen in FIGURE 3 wherein the completed workpiece may be removed from between the fixtures 18, 19 and another workpiece disposed therebetween.

It is to be noted that since the gibs 20, 21 are both disposed on the same side of the lower platen, there is free access to the latter from the front side and opposed ends to facilitate operation, maintenance and adjustments of the welding fixture carried thereby.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

A press mechanism, comprising a pair of horizontally spaced vertically extending frame members, each having a front surface and inner and outer side surfaces, said front and inner side surface of each merging to provide an upright corner surface at the front of the respective frame member, a vertically extending gib secured to each of said corner surfaces, an upper platen spanning the upper portions of said frame members for tying the two together in fixed relation, said upper platen being adapted to support an upper die, a vertically movable lower platen extending horizontally in front of said frame members and beyond the inner sides of each to substantially their outer sides so that access is available at both sides and the front of said lower platen, said lower platen having a pair of vertically disposed guide surfaces at its rear and inward of its respective sides, said guide surfaces slidably engaging said gibs to provide the sole guiding support for vertical travel of said lower platen.

References Cited in the file of this patent

UNITED STATES PATENTS

| | | |
|---|---|---|
| 188,693 | Talbott | Mar. 20, 1877 |
| 1,618,825 | Hazelton | Feb. 22, 1927 |
| 2,215,287 | Fox et al. | Sept. 17, 1940 |
| 2,336,351 | Flowers | Dec. 7, 1943 |
| 2,491,317 | Klocke | Dec. 13, 1949 |
| 2,916,987 | Hanni | Dec. 15, 1959 |

FOREIGN PATENTS

| | | |
|---|---|---|
| 450,069 | Canada | July 27, 1948 |
| 566,267 | Great Britain | Dec. 20, 1944 |